Sept. 21, 1954

D. B. GARDINER 2,689,583

POWER TRANSMISSION

Filed Nov. 26, 1949

INVENTOR.
DUNCAN B. GARDINER

BY *Ralph L. Tweedale*

ATTORNEY

Patented Sept. 21, 1954

2,689,583

UNITED STATES PATENT OFFICE 2,689,583

POWER TRANSMISSION

Duncan B. Gardiner, Detroit, Mich., assignor to Vickers Incorporated, Detroit, Mich., a corporation of Michigan Application November 26, 1949, Serial No. 129,667

6 Claims. (Cl. 137—490)

This invention relates to power transmissions, and is particularly applicable to those of the type comprising two or more fluid pressure energy translating devices, one of which may function as a pump and another as a fluid motor.

The invention is more particularly concerned with a pressure controlling or relief valve for use in such systems.

Pressure controlling or relief valves are utilized in such systems to relieve excessive pressure from a high pressure conduit to a relieving conduit. In many applications the relief valve must be capable of bypassing the full volume delivered by a high pressure, large displacement fluid pump.

One type of relief valve utilized is a simply constructed, spring loaded ball or poppet type. This type of relief valve is inadequate in applications where large fluid volume under high pressure has to be controlled. In operation, the ball valve is unstable laterally when left unguided and even where guides are provided it is subject to very poor regulation and squealing and chattering. The squealing, chattering, and poor regulation is caused by a change in the total pressure effective area when the valve is operated to the open or closed position. Although the total area exposed to fluid flow increases when the valve cracks to the open position the total pressure effective surface area decreases because of high velocity flow across the seat. In addition, this type of valve requires an extremely large spring.

Because of the inefficiency of the ball type relief valve for certain applications it is common practice to utilize balanced type pressure relief valves. This type of relief valve comprises a piston carrying a poppet valve, the latter of which controls a seat opening between a pressure inlet and an exhaust outlet. The piston has opposed pressure effective surface areas and when the pressures become unbalanced in an inlet chamber and control chamber the valve is operated by the piston to open the seat. The unbalancing of pressures is caused by the operation of a small pilot relief valve. This arrangement eliminates large springs as the pilot valve may be loaded by a small spring, it only being necessary for the pilot valve to handle small fluid flow in venting the control chamber, to cause the unbalanced pressure condition. A light spring of slight resistance may be used to bias the main valve to the closed position.

Some difficulties have been encountered with such valves, however, in maintaining concentricities of mating parts to insure positive seating and efficient operation. This adds to the manufacturing costs of such valves.

It is an object of this invention to provide an improved, simplified, balanced type of relief valve which minimizes the maintaining of concentricities of mating parts so as to lower manufacturing cost.

It is a further object of this invention to provide an improved pressure relief valve which utilizes a ball or poppet valve for controlling a seat opening but which eliminates the defects of prior constructions causing instability, squealing, and chattering.

It is still another object of this invention to provide a pressure relief valve incorporating the features of a balanced type relief valve and which utilizes a ball or poppet valve by providing a substantially stationary ball or poppet valve for controlling the opening of a substantially pressure balanced seat which is shiftable towards and away from the valve.

It is another object of this invention to provide an improved pressure relief valve which is economical to manufacture, efficient in operation, and which will perform over a long and useful life.

Further objects and advantages of the present invention will be apparent from the following description, reference being had to the accompanying drawing wherein a preferred form of the present invention is clearly shown.

Figure 1:
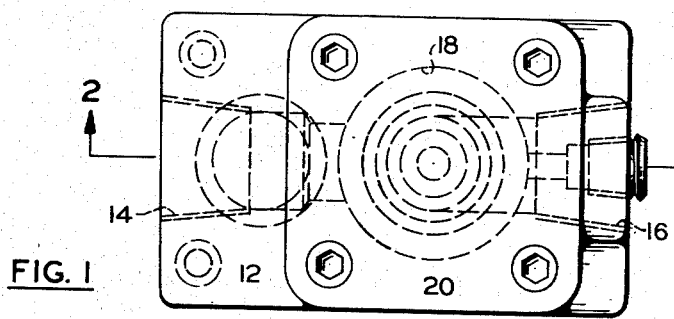
Figure 1 is a plan view of a preferred form of the present invention.
Figure 2:
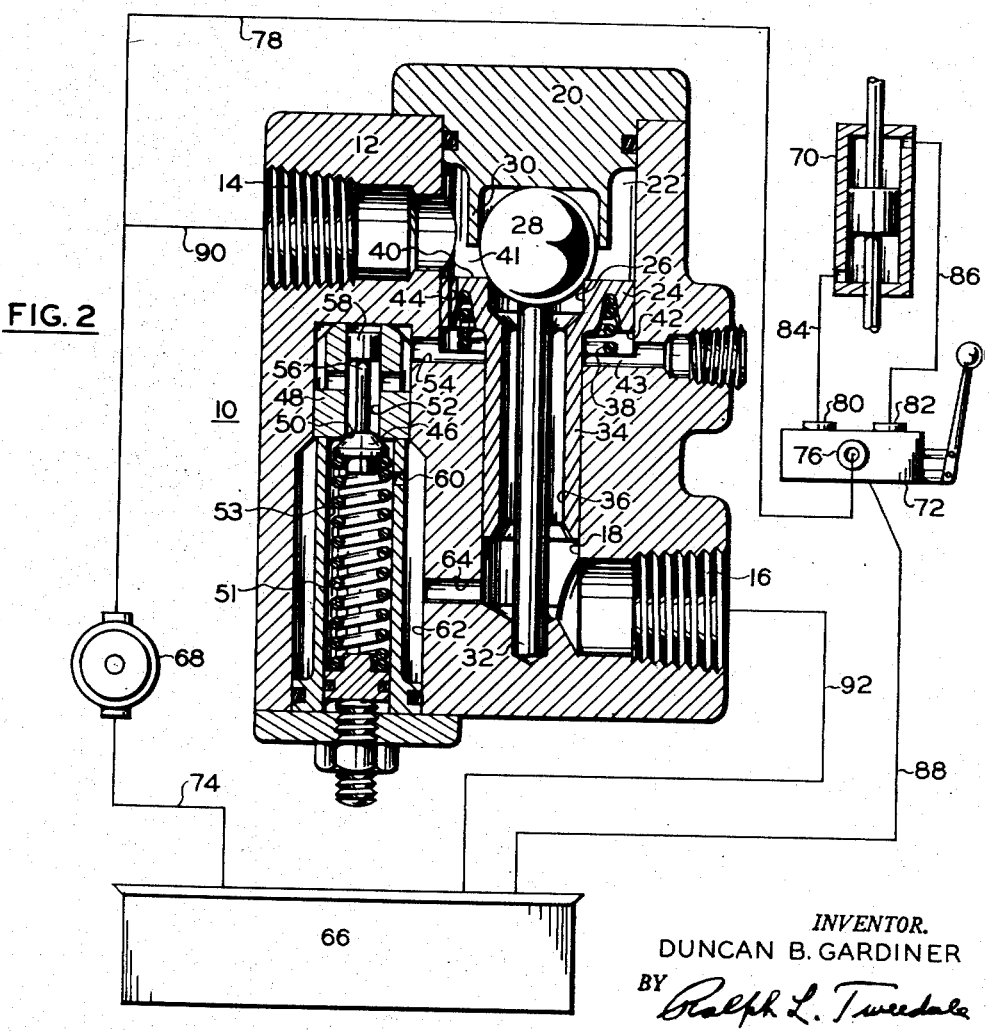
Figure 2 is a diagrammatic view of a hydraulic power transmission system incorporating a sectional view of a preferred form of the present invention taken on line 2—2 of Figure 1.

Referring to Figure 1 there is shown a hydraulic power transmission system incorporated within which is a pressure relief valve indicated generally by the numeral 10 and comprising a body 12 having an inlet port 14 and an exhaust port 16 transversely connected to a stepped bore 18. The upper portion of the bore 18 is closed by a cap 20 so as to form an enlarged chamber 22 within which is shiftably mounted a seat 24 having an opening 26. The opening 26 of the seat 24 is adapted to be controlled by a ball or poppet valve 28 which is maintained on a stationary seat 30 carried by the cap 20 by the medium of a pin or stem 32 which extends through the seat opening 26. The shiftable seat 24 has a guide portion 34 which is shiftable substantially in the lower and smaller portion of the bore 18. The guide portion 34 is provided with a vertical bore 36 which connects the seat opening 26 to the extreme lower portion of the bore 18, the latter of which is connected directly to the exhaust port 16. The stem or pin 32 is inserted through the seat opening 26 and the bore 36 of the extended portion 34 of the seat 24 and is arranged to substantially maintain the ball valve 28 on the stationary seat 30. Although the arrangement may be such as to maintain the ball stationary it is preferred that the ball valve 28 be free to rotate and to shift slightly so as to insure positive seating action of the valve on the seat 24. The seat 24 is biased against the valve 28 so as to normally close the seat opening 26 by a spring 38 and has substantially balanced opposing pressure effective surface areas 40 and 42 so as to divide the enlarged chamber 22 into an inlet chamber 41 connected to the inlet port 14 and a control chamber 43 connected to the inlet chamber 41 by means of a restriction 44 in the seat 24. Thus, the arrangement is such that the stationary seat 30 and the shiftable seat 24 are located in the enlarged chamber 22 in opposing relationship to each other.

Although it is possible to pressure actuate the seat 24 by pressure fluid directed to the inlet chamber and acting on the pressure effective surface area 40 it is preferred that the control chamber be vented to unbalance the pressures in the inlet and control chambers by means of a pressure operated pilot valve indicated by the numeral 46 and mounted in the body 12. The pilot valve 46 is biased upon a seat member 48 so as to close an opening 50 thereof by means of a spring 51 of predetermined resistance mounted in a spring chamber 53. The seat opening 50 is connected to the control chamber 43 of the main valve by a passage 52 and cross passage 54. The pilot valve 46 has a stem 56 carrying a guide piston 58 shiftable in the passage 52. When the pilot valve 46 is pressure operated from the seat 48 the opening 50 thereof is connected to the exhaust outlet by means of a transverse passage 60 connected to a bore 62 and a cross passage 64 which connects the bore 62 to the lower portion of stepped bore 18.

For the purpose of illustration the relief valve is shown incorporated in a hydraulic transmission system comprising a reservoir 66, a pump 68, a motor 70, and a directional control valve 72. The pump is connected to the reservoir 66 by a suction conduit 74 and to a pressure port 76 of the control valve 72 by a pressure delivery conduit 78. The opposite ends of the balanced type motor 70 are connected to motor ports 80 and 82 of the control valve 72 by conduits 84 and 86. The tank port, not shown, of the control valve 72 is connected to the reservoir 66 by a conduit 88. The pressure delivery conduit 78 of the pump 68 is connected to the pressure inlet port 14 of the relief valve 10 by a branch conduit 90 and the exhaust port 16 of the relief valve 10 is connected to the reservoir 66 by a conduit 92.

In operation, when the system pressure is below the setting of the pilot relief valve spring 51 the shiftable seat 24 remains biased against the ball valve 28 to close the seat opening 26. Because of the substantially balanced pressure effective surface areas 40 and 42 of the seat 24, until the control chamber 43 is vented by operation of the pilot valve 46 so as to unbalance the pressures existing in the inlet chamber 41 and the control chamber 43, the opening 26 of the seat 24 remains closed.

Whenever the pressure in the system increases above the resistance of the pilot valve spring 51 the pilot valve 46 will be operated to unblock the pilot valve seat opening 50 by pressure fluid directed thereto from the pump 68, conduits 78 and 90, inlet port 14, inlet chamber 41, restriction 44, control chamber 43, transverse passage 54 and passage 52.

Due to the fact that fluid may be displaced from the control chamber 43 to the reservoir 66 faster than fluid may enter such chamber through the restriction 44, the pressures become unbalanced in the inlet and control chambers 41 and 43 and pressure fluid acting on the pressure effective surface area 40 exposed to pressure in the inlet chamber 41 pressure operates the seat 24 away from the ball valve 28 against the slight resistance of the spring 38. The opening 26 becomes unblocked and pressure fluid from the pump 68 may then be bypassed to the reservoir 66 by means of the pressure inlet 14, inlet chamber 41, seat opening 26, passage 36, bore 18, exhaust port 16, and conduit 92. When the pressure in the system decreases to a value below the resistance of pilot valve spring 51 the pilot valve 46 closes the pilot valve seat opening 50. Due to the fact that the control chamber is not now vented, the pressures in the control and inlet chambers 43 and 41 become balanced, thus permitting the spring 38 to shift the seat 24 against the ball valve 28 to close the seat opening 26 and close communication between the inlet port 14 and exhaust port 16.

It should be noted that when the pilot valve is operated to vent the control chamber 43 and the pressures become unbalanced in the inlet chamber 41 and control chamber 43 that the seat 24 is shifted from the ball valve 28 by means of pressure fluid exerted against the pressure effective surface area 40 exposed to pressure in the inlet chamber 41. As the seat 24 shifts from the ball valve 28 the stem or pin 32 maintains the valve 28 in engagement with the stationary seat 30. When the seat shifts towards the valve the ball valve is free to rotate and to move slightly to find its correct seating position.

The arrangement is such that the shiftable seat may be directly pressure operated thereby eliminating the pilot valve, in which case a spring of greater resistance would be utilized to maintain the seat in engagement with the valve and the restriction would not have to be constructed in the seat. The defects of prior constructions are thereby eliminated because the pressure effective surface area remains the same instead of changing when the seat opening is unblocked. This eliminates chattering and also permits much better regulation of the valve, i. e., the differential between opening and closing may be confined to a much narrower range, because of the larger surface area exposed to inlet pressure which does not require the heavier springs such as is utilized in the conventional ball type relief valves.

It should also be noted that the construction of the valve body and parts mounted therein cooperate so that concentricity of mating bores is eliminated and that no two parts have to be mated which involve concentricity.

While the form of embodiment of the invention as herein disclosed constitutes a preferred form, it is to be understood that other forms might be adopted, all coming within the scope of the claims which follow.

What is claimed is as follows:

1. A liquid pressure relief valve comprising a body having an enlarged chamber connected to which is a pressure inlet and an exhaust outlet, a stationary valve seat and a shiftable valve seat oppositely arranged in the chamber and forming an inlet chamber connected to the pressure inlet and a control chamber, said shiftable valve seat having an opening connecting the inlet chamber to the exhaust outlet and opposed, substantially balanced, pressure effective surface areas exposed to pressures in the inlet and control chambers, means forming a restriction connecting the inlet chamber to the control chamber, a poppet valve for controlling the shiftable seat opening, a stem for the poppet valve inserted through the shiftable seat opening and arranged to maintain the poppet valve in engagement with the stationary seat and permitting a slight movement thereof, resilient means biasing the shiftable seat against the poppet valve to normally close the seat opening, and means forming a venting port leading from the control chamber adapted to be connected to a pilot relief valve responsive to predetermined increases of pressure at the pressure inlet for venting the control chamber said control chamber when vented creating unbalanced pressures in the inlet and control chambers and causing the shiftable seat to be pressure operated from the poppet valve and opening communication between the pressure inlet and the exhaust outlet.

2. A liquid pressure control valve comprising a body having an inlet port, an outlet port and an enlarged chamber, a stationary valve seat and a shiftable valve seat oppositely arranged in the chamber, said shiftable valve seat being arranged in the chamber to form an inlet chamber and a control chamber and having an opening extending therethrough and opposed pressure effective surface areas exposed to pressure in the inlet and control chambers, said inlet port leading to the inlet chamber and the outlet port being connected to the inlet chamber by the shiftable valve seat opening, a valve in the inlet chamber between the seats for controlling the shiftable seat opening including means maintaining the valve in engagement against the stationary seat, resilient means for normally maintaining the shiftable seat against the valve to close the shiftable seat opening, means forming a restriction connecting the inlet chamber to the control chamber, and means forming a venting port leading from the control chamber adapted to be opened and closed by auxiliary valve mechanism, said control chamber when vented creating unequal pressures in the inlet and control chambers and causing the shiftable seat to be pressure fluid operated from the valve to open communication between the inlet port and the outlet port.

3. A liquid pressure control valve comprising a body having an inlet port, an outlet port and an enlarged chamber, a stationary valve seat and a shiftable valve seat oppositely arranged in the chamber, said shiftable valve seat being arranged in the chamber to form an inlet chamber and a control chamber and having an opening extending therethrough and opposed pressure effective surface areas exposed to pressure in the inlet and control chambers, said inlet port leading to the inlet chamber and the outlet port being connected to the inlet chamber by the shiftable valve seat opening, a poppet valve in the inlet chamber between the seats for controlling the shiftable seat opening including a stem member extending through the seat opening and arranged to continuously maintain the poppet valve substantially in stationary engagement against the stationary valve seat, resilient means for normally maintaining the shiftable seat against the valve to close the shiftable seat opening, means forming a restriction connecting the inlet chamber to the control chamber, and means forming a venting port leading from the control chamber adapted to be opened and closed by auxiliary valve mechanism, said control chamber when vented creating unequal pressures in the inlet and control chambers and causing the shiftable seat to be pressure fluid operated from the valve to open communication between the inlet port and the outlet port.

4. A liquid pressure control valve comprising a body member having a stepped bore, one portion of which forms an enlarged chamber, a piston floatably mounted in the chamber and having a stem extending into and slidable within the other portion of the bore, said piston and stem having a flow passage extending completely therethrough and the opening at the piston end of said passage forming a valve seat, a poppet valve stationarily mounted in the chamber, resilient means of predetermined resistance normally biasing the piston against the poppet valve to close the valve seat opening, said piston and walls of the enlarged chamber forming an inlet chamber and a control chamber on opposite sides of the piston and the opposed surfaces of the piston exposed to pressure in the chambers comprising substantially balanced pressure operating surfaces, an inlet passage leading to the inlet chamber and an outlet passage leading from the other portion of the stepped bore, a restricted passage connecting the inlet chamber to the control chamber, and a venting port leading from the control chamber adapted to be connected to a pressure responsive pilot valve for unbalancing the pressures in the inlet and control chambers.

5. A liquid pressure control valve comprising a body member having a stepped bore, one portion of which forms an enlarged chamber, a piston floatably mounted in the chamber and having a stem extending into and slidable within the other portion of the bore, said piston and stem having a flow passage extending completely therethrough and the opening at the piston end of said passage forming a valve seat, a second stationary valve seat in the chamber arranged oppositely to the piston valve seat, a poppet valve between the seats including means for maintaining the poppet valve against the second seat, resilient means of predetermined resistance normally biasing the piston against the poppet valve to close the valve seat opening, said piston and walls of the enlarged chamber forming an inlet chamber and a control chamber on opposite sides of the piston and the opposed surfaces of the piston exposed to pressure in the chambers comprising substantially balanced pressure operating surfaces, an inlet passage leading to the inlet chamber and an outlet passage leading from the other portion of the stepped bore, a restricted passage connecting the inlet chamber to the control chamber, and a venting port leading from the control chamber adapted to be connected to a pressure responsive pilot valve for unbalancing the pressures in the inlet and control chambers.

6. A liquid pressure control valve comprising a body member having a stepped bore, one portion of which forms an enlarged chamber, a piston floatably mounted in the chamber and having a stem extending into and slidable within the other portion of the bore, said piston and stem having a flow passage extending completely therethrough and the opening at the piston end of said passage forming a valve seat, a second valve seat in the chamber facing the first valve seat opening, a poppet valve between the two seats, a stem for the poppet valve extending through the first valve seat flow passage in a manner to leave said flow passage open and maintaining the poppet valve in engagement against the second valve seat, resilient means of predetermined resistance normally biasing the piston against the poppet valve to close the valve seat opening, said piston and walls of the enlarged chamber forming an inlet chamber and a control chamber on opposite sides of the piston and the opposed surfaces of the piston exposed to pressure in the chambers comprising substantially balanced pressure operating surfaces, an inlet passage leading to the inlet chamber and an outlet passage leading from the other portion of the stepped bore, a restricted passage connecting the inlet chamber to the control chamber, and a venting port leading from the control chamber adapted to be connected to a pressure responsive pilot valve for unbalancing the pressures in the inlet and control chambers.

References Cited in the file of this patent

UNITED STATES PATENTS

| Number | Name | Date |
|---|---|---|
| 2,244,212 | Patton | June 3, 1941 |
| 2,249,206 | Hubbard | July 15, 1941 |
| 2,308,753 | Hart | Jan. 19, 1943 |
| 2,360,816 | Pasco | Oct. 17, 1944 |
| 2,451,586 | Strid | Oct. 19, 1948 |
| 2,472,049 | Schneck | May 31, 1949 |
| 2,477,247 | Haberland | July 26, 1949 |